US009054969B2

(12) United States Patent
Cohen et al.

(10) Patent No.: US 9,054,969 B2
(45) Date of Patent: Jun. 9, 2015

(54) SYSTEM AND METHOD FOR SITUATION-AWARE IP-BASED COMMUNICATION INTERCEPTION AND INTELLIGENCE EXTRACTION

(71) Applicant: NICE SYSTEMS LTD., Ra'anana (IL)

(72) Inventors: Noam Cohen, Kibbutz Givat Brenner (IL); Yoram Ehrlich, Ramat HaSharon (IL)

(73) Assignee: NICE-SYSTEMS LTD., Ra'anana (IL)

( * ) Notice: Subject to any disclaimer, the term of this patent is extended or adjusted under 35 U.S.C. 154(b) by 237 days.

(21) Appl. No.: 13/731,836

(22) Filed: Dec. 31, 2012

(65) Prior Publication Data

US 2013/0336137 A1    Dec. 19, 2013

Related U.S. Application Data

(60) Provisional application No. 61/660,109, filed on Jun. 15, 2012.

(51) Int. Cl.
*H04L 12/26*    (2006.01)
(52) U.S. Cl.
CPC ............ *H04L 43/0876* (2013.01); *H04L 43/04* (2013.01)

(58) Field of Classification Search
CPC .................................................. H04L 43/0876
USPC .......................................................... 370/252
See application file for complete search history.

(56) References Cited

U.S. PATENT DOCUMENTS

| 7,631,042 | B2 | 12/2009 | Chen et al. | |
| 8,849,993 | B2 * | 9/2014 | Cooper et al. | 709/224 |
| 2007/0008884 | A1 * | 1/2007 | Tang | 370/230 |
| 2007/0288247 | A1 * | 12/2007 | Mackay | 705/1 |

* cited by examiner

*Primary Examiner* — Wei Zhao
(74) *Attorney, Agent, or Firm* — Pearl Cohen Zedek Latzer Baratz LLP

(57) ABSTRACT

A system and method for monitoring Internet Protocol (IP) data traffic may include receiving IP data generated by a target device interacting on the Internet, determining at least one activity performed by the target device based on the IP data, wherein an activity describes an interaction on the Internet, and aggregating data describing the at least one activity into one or more chunks, each chunk corresponding to a portion of time and at least one activity performed by the targets.

18 Claims, 10 Drawing Sheets

| Time | Activity ID | Source |
|---|---|---|
| 8:00 | Email | Gmail |
| 8:14 | Email | Gmail |
| 8:30 | Email | Gmail |
| 8:37 | Browse | CNN |
| 8:43 | Browse | CNN |
| 9:03 | Browse | CNN |
| 9:12 | Instant Messaging | Yahoo Chat |
| 9:30 | Instant Messaging | Yahoo Chat |
| 9:38 | Instant Messaging | Yahoo Chat |
| 9:56 | Post | Twitter |
| 9:56 | Post | Facebook |
| 10:12 | Post | Twitter |
| 10:28 | Search | Google |
| 10:47 | Search | Google |
| 10:52 | Browse | New York Times |
| 10:55 | Browse | New York Times |
| 10:59 | Email | Gmail |
| 11:03 | Email | Hotmail |
| 11:09 | Instant Messaging | MSN Messenger |
| 11:09 | Instant Messaging | MSN Messenger |
| 11:26 | Post | Gawker |
| 11:31 | Post | Gawker |
| 11:49 | Post | Gawker |

FIG. 6B

SYSTEM AND METHOD FOR SITUATION-AWARE IP-BASED COMMUNICATION INTERCEPTION AND INTELLIGENCE EXTRACTION

PRIOR APPLICATION DATA

The present application claims benefit from prior provisional application Ser. No. 61/660,109 filed on Jun. 15, 2012 and entitled "SYSTEM AND METHOD FOR SITUATION-AWARE IP-BASED COMMUNICATION INTERCEPTION AND INTELLIGENCE EXTRACTION".

FIELD OF THE PRESENT INVENTION

The present invention is related to monitoring Internet Protocol (IP) data traffic.

BACKGROUND

Many current data traffic interception systems are primarily designed for telecommunication systems with Time Division Multiplexing (TDM)/Telephony (including SMS) traffic. Intercepted telecommunication events may include few source types, i.e. voice or Short Message Service (SMS) data, and may occur at a rate of only a few dozen times per day, a relatively low rate compared to other kinds of data traffic. A person monitoring a target may be easily able to analyze a target's activity for example, based on the target's telephone calls. This may be due to the nature of voice, in which the meaning and significance of the interception is well understood. Extracting intelligence and formulating situation awareness may be a well-understood and straightforward process because of the low data rates and simple data structure of telephony-based services.

However, IP data traffic monitoring may stress many of the implicit design and operational methodology of traditional (i.e. TDM/Telephony) interception systems. Many data source types may be included in IP data, including voice data (via Voice Over Internet Protocol, or VOIP), instant messaging data, Internet website traffic, video streaming data, image data and many other types as the ability to express and share via new applications in new 'IP world' are virtually unlimited. Further, for every target, IP traffic data may consume a large amount of bandwidth and volume, e.g. 14 GB per month or more, amounting to many thousands of IP events (transactions and flows) per day. Extracting content to gain an overall understanding, i.e situation awareness, of a target's activities on the Internet may stress current monitoring systems due to IP data's volume and complexity.

SUMMARY

A method for monitoring Internet Protocol (IP) data traffic may include receiving IP data generated by a target device interacting on the Internet, determining at least one activity performed by the target device based on the IP data, wherein an activity describes an interaction on the Internet, and aggregating data describing the at least one activity into one or more chunks, each chunk corresponding to a portion of time and at least one activity performed by the target.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 6B-6E are example displays of queues of chunks, according to an embodiment of the invention.

Figure 1:
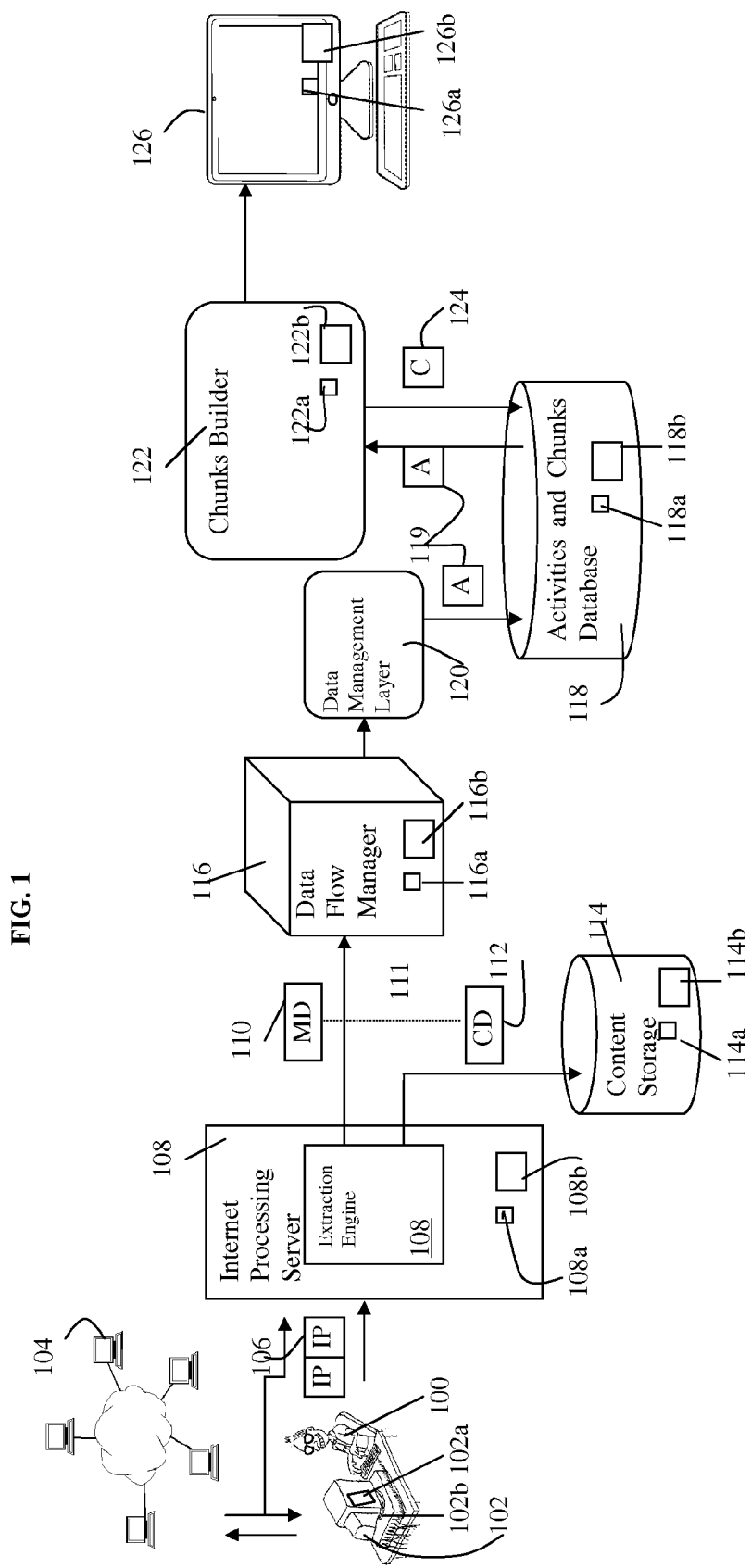
FIG. 1 is a schematic illustration of a system for monitoring data traffic, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

When used herein, the "Internet" may refer to a system of computer networks that use the Internet Protocol Suite (IP) to deliver content to users. Content accessed by users of the Internet may include news websites, social networks, communication services such as e-mail or instant messaging, multimedia such as radio or video, or blogs, a few examples of many types of content and services that may be accessed by users. Applications or services, such as a new website or a social networking website, may be operated by one or more servers and accessed or used remotely by users.

When used herein, the "web" may refer to the World Wide Web, which may include the Internet and/or an Intranet. The web may be used interchangeably with the Internet and/or Intranet, as the web is a system of interlinked hypertext documents and programs (e.g., VOW telephone programs, streaming media programs) accessed via the Internet and/or Intranet.

When used herein, "target device" may mean any computer or device used by a user, to connect to the Internet and interact with content on the Internet. A "target" may be the user of the target device whose activities on the internet are being monitored. Target devices may include a desktop or laptop computer, smartphone, tablet computer, mobile device or other device that is able to access the Internet. A target "device" may include a process, such as a software process or internet browser session operating on a device. In some embodiments, a target device or its activity or communications may be monitored, for example, through a computer used by an employer of the user, for example, to measure the user's productivity. A security agency may have the authority to intercept IP traffic from a target using a target device. In another example, the target device may be monitored by a marketing company determining how users typically navigate the Internet or interact with various content providers. Other instances of monitoring target devices may be used.

An interaction on the Internet performed by a target may be any communication with another server computer via the Internet. The interaction performed by the target may facilitate communication between the user and another person or allow the user to access content or media on the web. Communication between people on the Internet may include e-mail messages, instant messaging, blogging, VOW or posting messages on social networking websites. Accessing content on the web may include browsing news websites, accessing video content, or downloading music content. Many other forms of interactions may occur between a target's computer and the Internet.

Embodiments of the invention may allow efficient and intelligent IP data traffic monitoring. IP data traffic may involve multiple data source types that come from the many types of human interactions on the Internet, such as e-mail and instant messaging, or non-communicative interactions such as web browsing. The source types may use many applications, and multiple source types may be used concurrently by a target. A monitor or surveillance entity may have difficulty discerning from the multitude of source types and application a digestible understanding of events or situations occurring through the interactions of targets on the Internet. Further, IP traffic may include thousands of events in a day, and a human monitor may be unable to thoroughly review and analyze the events for the most important events. Embodiments of the invention may enable generation, processing, and presentation of intelligence regarding a target's activities, by representing interactions across different applications in a set of meaningful data structures. The intelligence may be presented in a summarized view, for example, and may offset or reduce the time required by a human's ordinary intelligence gathering faculties for analyzing interactions. The summarized views may provide and enable comprehensive visual analyses and synopses of a target's activities, further than would be provided by simple content extraction and replay systems. During time periods where multiple types of events may occur concurrently, embodiments of the invention may bestow a sense of situation awareness to a human monitor. The monitoring process involves a queue of chunks, which, as described, may be an aggregated time slice of abstractions. In this way, the human monitor can quickly grasp in near real time a situational awareness of incoming information at high bandwidth with different source types, while deciding on whether the chunk includes important information that should be produced. The queue of chunks may enable the human monitor to move back and forth between newly arriving chunks of new data and investigation of previously arrived chunks. The queue of chunks in the monitoring method may provide the means to process information without loss and to produce only relevant events.

Embodiments of the invention may employ an abstraction process to model and interpret multiple applications and source types into commonly understood activities on the Internet. Instead of decoding and presenting application data protocol, the abstraction process provides data structures that incorporate information from the application data and may explain the IP traffic in layman's terms, rather than technical events. The abstraction process may result in an output of an activity data structure, a basic intelligence event which describes commonly understood activities on the Internet and is also linked to detailed technical information surrounding the activity. The activity may be grouped into chunks, which may be a time-slice aggregated object of abstracted activities, or data representing real-world activities (e.g., data representing e-mail exchanges), and the activities that comprise a chunk may be abstracted from multiple sources and applications. The activities, when viewed individually, may be confusing for a human to digest. When viewed in a chunk, a comprehensive snapshot of interactions may be provided. Taken together, the chunks may assist in the monitoring process. The tasks of monitoring may include formulating situation analysis at a glance in a synopsis or log, alerting a monitor of high priority information, or routing information for production or later presentation.

A continuous inflow of IP traffic, regardless of traffic velocity, may be processed and monitored for situation awareness (e.g., imparting loss-less comprehension of what is happening in one or more targets' IP traffic activities). Structures may be created for different decoded IP traffic applications and protocols. The structures may be processed to facilitate comprehension of target activities and application decomposition. Application decomposition structures may be related to target traffic such a contact lists or webmail inbox folder structure. Processed structures may be termed "intelligence structures" which may be used to create real world activity equivalents (versus technical transactional decoding). Chunks may be created, time slice containers of multiple coincident intelligence structures.

According to embodiments of the invention, target device interactions may generate gigabytes or more of Internet or IP traffic in the form of IP packets. IP packets may include data in Hypertext Transfer Protocol (HTTP) format. HTTP may be the foundational protocol used to transfer content and message on the web. HTTP data may include messages that request connections or methods from a server or computer. The messages may include header fields describing a location or referrer of the message or cookie information. The messages may further include body data that describe content to be displayed on a target's computer or information about the target required by the server. HTTP data may carry information required for browsing websites, e-mail, instant messaging, or other types of Internet interactions. HTTP data may be quickly processed, saved, and parsed in order to intelligently monitor and gain a high level understanding of a target's activity on the Internet.

An embodiment of an IP data traffic monitoring method may include receiving IP data, generated by a target interacting on the Internet. Such interactions may include browsing websites or electronically communicating through instant messaging or e-mail messages, for example. The IP data may include HTTP data which describes exchanged information between a target's computer and a server on the Internet in order to deliver content to the target or send content from the target. The IP data may be received by a server located remotely or connected to the target's computer via for example an intranet. The server may host an extraction engine for extracting metadata or metadata objects which may be linked to or indexed to content data. The metadata or metadata objects may include information describing a web service (e.g., a program, service or website typically accessed via the Internet) accessed by the target and its parameters or properties. The linked content data may describe content exchanged between the target and for example a server on the Internet providing the web service. For example, if a target utilized an e-mail service, the engine may extract or derive data such as a metadata object from the IP data. A metadata object may include metadata describing aspects or details of the IP data, such as web service or web application parameters. A web service may have unique parameters or properties that are required to interact with the web service. The values of the parameters may describe the different kinds of interactions that are possible with the web service. Metadata for e-mail may include, for example e-mail message properties such as to/from (sender/recipient) addresses, subject, date (and possibly time), domain of sender and/or recipient, or other properties. Metadata for a social media interaction web service may include, for example, a type of message posted (e.g., private, public, or limited to a social network), recipients, content type of the message (e.g., a link, a photo, a video), or other properties.

The metadata object may be linked to content data, which may be stored in memory or a database. Content data may be the actual data, content, or messages corresponding to the activity or application (e.g., a program used to generate traffic, such as an e-mail program, a social media program, a web-site corresponding to a publication, etc.), for example content or messages exchanged between the target device and a server providing the web service, and possibly categorized, assigned or aggregated into the data. For example, content data for an IP telephone conversation may be an audio recording of the conversation which was made up of the intercepted IP packets. Content data for e-mail service, for example, may be the e-mail body message or an attachment file. The metadata may further include information on the location of the content data within the database or other storage device. The metadata or metadata objects may each be assigned or labeled with one or more identifiers such as numerical identifiers based on the web service or web application parameters described in the metadata. Identifiers or labels other than numerical identifiers may be used. An abstraction data object may be created that includes the identifiers, and the abstraction data may point to or reference the metadata and linked content data. The abstraction data may be sent to another server, such as a data flow manager, to determine at least one activity executed or performed by the target.

An application may be software operated via the Internet for example e-mail software, telephone applications, a website to access a certain media or other program, etc. In some embodiments, an application may correspond to a general type of program, such as e-mail, social media, news website, shopping website, etc. In other embodiments, an application may be a program on a specific webhost, such as Yahoo e-mail, LinkedIn, or Amazon.com. An activity may be a category of user action or activity using an application which may be made up of, describe or may correspond to an interaction on the Internet, typically using an application. Different interactions may be, for example, clicking or otherwise indicating (e.g., using a pointing device such as a mouse or touch screen to indicate) on links on an application website, entering text into a text box, web form, or chat box, speaking into the computer through a VOIP application, opening an attachment from an e-mail message, clicking on an e-mail message to receive a message and/or attachments, uploading files to a cloud service, or other actions performed at a target device connected to the Internet.

The activities may be separated or categorized broadly into two main categories: communication activities and non-communications activities. Other categories may be used. The communications activities may be among or between one or more humans using a device on the Internet in a manner such that the participants are purposefully directing their communications directly at a circumscribed set of people defined by the communications session. Examples of communications activities may be for example, e-mail, VOIP telephony, and instant messaging or messaging via Facebook, where each party defines the party or parties receiving the communications. The non-communication activities may be for example content browsing, reading a blog, or reading an on-line periodical; in general, the non-communication activities may represent content consumption. The activities that result from the abstraction process may be grouped or aggregated into chunks.

Interactions may generate IP data, such as data between a server operating an application and a user computer providing an interface to a user via a web browser. An activity may be determined, based on the IP data, that more broadly describes a category or type of interaction. For example, different activities may include private browsing, messaging, instant messaging, posting, using social media services (e.g., Facebook, LinkedIn), or searching. Data describing the activities may also include the source of the activity, such as websites at which that the target interacted, or parties with whom the user of a target device communicates. Other activities and sources may be delineated. Data describing the one or more activities may include a reference to the correlated metadata that were grouped into the activity.

In some embodiments, activities (typically the data representing or corresponding to the activities) may be assigned, formed, compiled or aggregated into groups or chunks, where each group of chunk describes, or corresponds to, a portion or period of time and one or more activities performed by the user during that period or portion of time, and other data such as the application, activity or interaction generating the data. The forming or compiling may be based on for example the time the IP traffic or packets were transmitted; e.g., the chunks may correspond to a certain time period or frame, and may contain IP traffic or packets sent or received during that time period. Time stamps other than transmission time may be used. Activities and interactions on the internet may be formed of or represented by data such as IP or internet traffic, which may be assembled or compiled into chunks or groups, where the groups correspond to for example an activity or application and a time or other aspects of the traffic. Forming, compiling or aggregating data into chunks may include creating chunks, or creating data structures forming chunks, which include the data. Typically, a chunk is a data structure, or the data or activity described by that data structure, containing abstracted data corresponding to network or internet traffic associated with a particular activity during a particular time period or portion. A queue, graph or other display of one or more chunks may be displayed on a graphical user interface, through a computer screen, for example. The computer screen may be viewed remotely or through an internal network.

FIG. 1 is a schematic illustration of a system for monitoring data traffic, according to an embodiment of the invention. A user 100, via a target device 102, may interact with a computer network such as the Internet 104, and the target's interactions may generate IP data packets 106. The IP data packets may come from the user 100's target device or computer 102, which includes a processor 102a and memory 102b, or from content delivered to the user 100 from the Internet 104. The user's 100 target device 102 may be connected to a data traffic monitoring network, which may be connected to the Internet 104, or may be connected through an internal network, or both. An Internet processing server (IPS) 108, including processor 108a and memory 108b, may receive the IP data packets 106 generated by the target's 100 interactions. The IPS may host a decoding or extraction engine 108 to decode the IP data 106 into metadata 110 indexed or linked 111 to content data 112. The content data 112 may be stored in a content storage 114 database or memory 114b. Memory 114b may be a storage device, for example. The content storage may include its own processor 114a.

Metadata 110 may be sent to a data flow manager 116, which may be another server that includes a processor 116a and memory 116b. The data flow manager 116 may determine at least one activity 119 performed by the target 100 by correlating, associating or grouping metadata 110 to other metadata 110 that describe similar or contemporaneous actions performed by the user on the Internet. For example, metadata 110 may be correlated or associated if the metadata describes similar or related web service parameters. For example, metadata objects each describing an attachment in an e-mail may be correlated or associated, and they may also be correlated or associated with the e-mail message. In another example, one metadata object may describe a G-mail chat sent to a person and another metadata object may describe an e-mail sent using G-mail to the same person and having the same subject matter as the chat. Those metadata objects may also be correlated, associated, or grouped together. In some embodiments, extraction engine 108 may assign one or more identifiers or labels such as numerical identifiers to the metadata objects, based on the web service parameters or web application parameters described by the metadata objects. Identifiers other than numerical identifiers may be used. The identifiers may be assigned in an abstraction data object that may further reference the metadata and linked or indexed content data. The data flow manager 116 may correlate or group abstraction data objects to other abstraction data objects by comparing the numerical identifiers and grouping abstraction objects containing metadata and similar or nearly equal numerical identifiers into an activity. The data flow manager 116 may determine that the identifiers describe similar and/or contemporaneous web service actions according to a rule set or correlation map that describes which services should be correlated together, and which actions within a certain amount of time might be correlated together.

While a specific structure and organization is described, other structures may be used. For example, analysis of IP data and extraction of data need not be performed on a server or the specific servers shown, and a user or target may be connected to a monitoring device through different network connections than those shown. The various databases shown may be organized differently.

Data describing the activity 119 may include parameters from a target's interaction on the Internet 104. The description may include for example an activity identification (ID) name, source type, website origination, or other relevant descriptors. In one embodiment, the activity data 119 may be sent to storage, such as the activities and chunks database 118, which may include a processor 118a and memory 118b, which may be a storage device, for example. The activities and chunks database 118 may be separate from the content storage 114 database, or they may be connected. The one or more activities may be sent to the activities and chunks database 118 through a data management layer 120 for efficient data transfer. The data management layer 120 may be software or logic that controls the amount of data that is read into the activities and chunks database 118 at one time. A chunks builder 122, including a processor 122a and memory 122b, may assign or aggregate the one or more determined activities into one or more chunks 124. To aggregate activities into chunks, typically, data representing or corresponding to the activity (e.g., private browsing, instant messaging, voice calls) is compiled, linked to or saved into a data structure which is the chunk. Each chunk 124 may correspond to a portion or period of time and at least one activity performed during the portion of time. Chunks may correspond to sequences or periods of time which may be combinations of fixed minimal periods of time. For example, chunks may be contiguous periods of 30 minutes. Each chunk typically corresponds to a definite period of time; e.g., 9:15 AM to 10 AM on Aug. 23, 2010. The chunks 126 may be displayed as a queue, graph or other display on a monitoring device, which may include a processor 126a and memory 126b. In some embodiments, the chunk data may be stored according to the portion or period of time and a category or type of activity. The queue of Chunks is an embodiment of the monitoring process.

Figure 2:
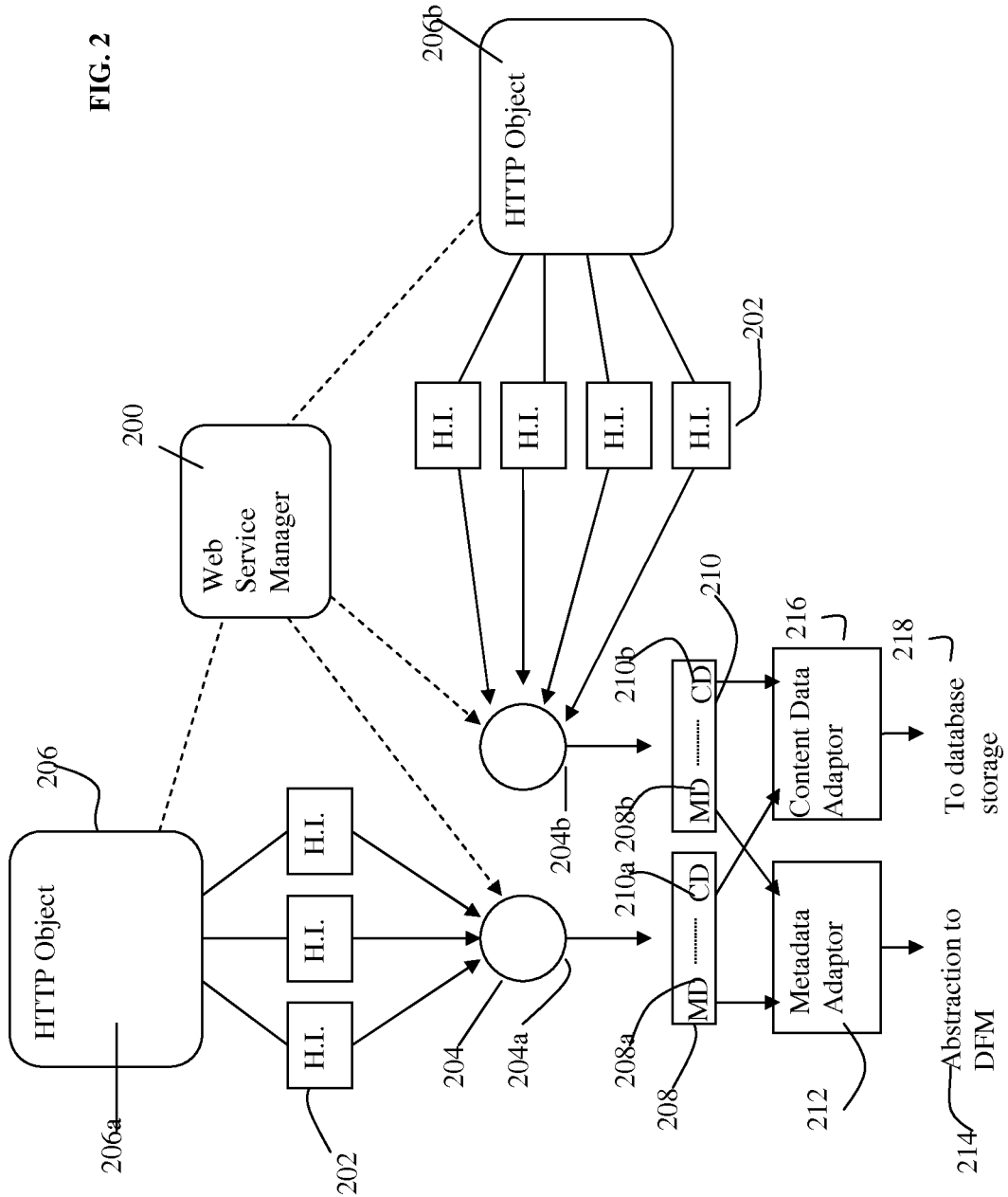
FIG. 2 is a schematic of data structures and objects used by an extraction engine according to an embodiment of the invention.

FIG. 2 is a schematic of data structures and objects used by the extraction engine 108 shown in FIG. 1, according to an embodiment of the invention. The extraction engine 108 may include a web service manager 200 to manage the allocation and de-allocation of HTTP items (H.I.) 202 in web service objects 204. As discussed previously, IP data may include data in HTTP format, where clients, such as the target device, send request messages and servers send response messages, or vice versa. Each message may include a header section and a body section. Other structures for monitored data from which metadata is extracted may be used. The header section may include for example, authentication information or session ID information. When content data is exchanged between a target and a server on the Internet, an HTTP session may be established. For each established HTTP session, more than one request/response message pair may be sent between the target and the server. Each message in the request/response message pair may include a header and a body, which may be compatible with the HTTP protocol. The web service manager 200 may allocate an HTTP object 206 in memory to correlate, sort or categorize response/request message pairs into an H.I. 202 for every HTTP session established. For example, as shown in FIG. 2, if two HTTP sessions are established, the web service manager 200 may allocate two HTTP objects 206a, 206b to correlate each message pair sent into H.I. 202. For each established HTTP session, the web service manager 200 may further allocate a web service object 204a, 204b to analyze each H.I. 202 and extract or derive metadata 208 that includes the properties of a web service accessed by the target during the established HTTP session. The metadata 208 for each session may each be respectively linked or indexed to content data 210. For example, for a first established HTTP sessions, a first HTTP object 206a and a corresponding web service object 204a may be allocated. For a second established HTTP session, a second HTTP object 206b and a corresponding second web service object 204b may be allocated. Each of first and second web service objects 204a, 204b may analyze each H.I. 202 from their respective HTTP sessions. The first web service object, for example, may extract a first set of metadata 208*a* that is linked or indexed to a first set of content data 210*a*. The second web service object may extract a second set of metadata 208*b* that is linked or indexed to a second set of content data 210*b*. The content data 210*a*, 210*b* may be sent to storage, and the metadata 208*a*, 208*b* may be sent to a data flow manager to determine activity data based on the metadata 208*a*, 208*b*.

In some embodiments, the extracted metadata 208 may describe the properties of a web service accessed by the target during one of many HTTP sessions. The metadata object 208 may have a general format that describes properties of a general web service regardless of the web service source. General web services may include for example e-mail, instant messaging, search, forms, or P2P file sharing, for example. The metadata object 208 may also have a proprietary format that describes properties of web services that are particular to a source or webhost, such as Yahoo! mail, Google mail, MSN search, or AOL Instant Messaging, for example. A general service may mean a category, and the particular or proprietary service may be the brand or company providing the service. E.g., the general service may be social networking, and the specific may be Facebook; the general may be on-line publications, and the specific may be the New York Times. Configuration files written in Extensible Markup Language (XML), for example, may define each type of web service and their properties or parameters. The web service object 204 may parse through each H.I. 202 and refer to the configuration file to derive metadata describing each web service in a general or proprietary format. For general web services, a general configuration file may include a section for each web service and a list of properties or parameters. Each property or parameter may have a type, a unique ID to identify the type in the data flow manager, a description, and a data type. Other data may be included. Each section may also describe mandatory properties and optional properties. The properties or parameters may describe other aspects of each web service. An example of chat service metadata defined by a general format XML configuration is shown below (other code may be used):

```
<Service>
    <Type> Chat                              </Type>
    <MandatoryProps>    1,2,3       </MandatoryProps>
    <Property_1>
        <Type>          From            </Type>
        <RefId>         1001            </RefId>
        <Description>   Chat Party      </Description>
        <DataType>      Bytes           </DataType>
    </Property_1>
    <Property_2>
        <Type>          To              </Type>
        <RefId>         1002            </RefId>
        <Description>   Chat Party      </Description>
        <DataType>      Bytes           </DataType>
    </Property_2>
    <Property_3>
        <Type>          Message         </Type>
        <RefId>         1003            </RefId>
        <Description>   Chat Message    </Description>
        <DataType>      Bytes           </DataType>
    </Property_3>
    <Property_4>
        <Type>          FileTransferName </Type>
        <RefId>         1004            </RefId>
        <Description>   File Name       </Description>
        <DataType>      Bytes           </DataType>
    </Property_4>
    <Property_5>
        <Type>          FileTransferData </Type>
        <RefId>         1005            </RefId>
        <Description>   File Data       </Description>
        <DataType>      Bytes           </DataType>
    </Property_5>
<Service>
```

As shown above, chat service metadata in a general configuration may include, for example, From, To, Message, FileTransferName, and FileTransferData parameters. Other or different data may be included. Each of the parameters may have for example a RefID to identify them, and a data type. In some embodiments, each property or parameter may be extracted from an H.I. 202.

A proprietary configuration format may define a proprietary web service that is specific to a webhost. The format for the proprietary configuration file may be more generalized to cover a wide range of services performed by a webhost. An example of a proprietary format is shown below (other examples may be used):

```
<Identifiers>
    <Identifier_1>
        <Description>                   </Description>
        <Attribute_1>
            <InputSection >             </InputSection >
            <ContentParser>             </ContentParser>
            <KeyAttr>
                <KeyVal>                </ KeyVal >
                <BindProperty> Identifier </BindProperty>
                <NextAttr>              </NextAttr>
            </KeyAttr>
        </Attribute_1>
        <Attribute_2>                   </Attribute_2>
        <Attribute_3>                   </Attribute_3>
    </Identifier_1>
    <Identifier_2>                      </Identifier_2>
    <Identifier_3>                      </Identifier_3>
</Identifiers>
```

```
<ServiceName>
    <Section>
        <Description>          </Description>
        <Attribute_1>
            <InputSection >    </InputSection >
            <ContentParser>    </ContentParser>
            <KeyAttr>
                <KeyVal>           </ KeyVal >
                <BindProperty>     </BindProperty>
                <NextAttr>         </NextAttr>
            </KeyAttr>
        </Attribute_1>
        <Attribute_2>          </Attribute_2>
        <Attribute_3>          </Attribute_3>
    <Section>        </Section>
    <Section>        </Section>
</ServiceName>
```

As shown in the above example, a proprietary format may utilize attributes, which may be a general structure that describes parameters. The proprietary format may include identifiers that identify the webhost. The identifiers may further include attributes to describe properties of the webhost. For example, the webhost might be yahoo.com. The webhost may provide an application or service, such as a chat service, which may involve multiple H.I.'s to describe chat service parameters. Each service parameter may be represented in a section, which also includes attributes that describe the parameter's properties. For example, the Yahoo chat service may require sections for from, to, message type, or browser type, parameters. Each of these parameters may be described by an attributes section. Attributes may include data type, party identifiers, party addresses, or reference ID's, for example. Other ways of organizing web service parameters and web services may be used.

Based on the metadata 208, which may be in a general or proprietary format, or other formats, the web service object may create a metadata message that includes the metadata and reference to linked content data. The metadata message may be sent to a metadata adaptor 212, which is able to interpret the metadata message and its contents, and assign one or more numerical identifiers to the metadata message, based on the parameters described by the metadata message. The metadata adaptor may output an abstraction message or data object, which may include the assigned numerical identifiers, metadata, and reference to linked content data. The content data extracted by the web service object 204 may be sent to a content data adaptor 216, which may export the content to a database 218 for storage. As an example, e-mail attachment metadata may include parameters such as subject, parties, date, body file info (e.g., name, ID, type, size), or language. Other parameters may be used. E-mail attachment content data may include the attachment file content. The web service object 204 may create a metadata message that includes the metadata information and send it to the metadata adaptor 212. The metadata adaptor 212 may assign one or more numerical identifiers in an abstraction data message or object 214, based on the metadata parameters. The abstraction may then be sent to the data flow manager.

Numerical identifiers may have different data types, including numbers, strings, hex values, or Boolean values, for example. The numerical identifiers may be generated based on the metadata's characteristics and parameters, or based on the web service parameters themselves. For example, numerical identifiers may correspond to an activity type or subtypes, a time frame or stamp, whether the metadata is cumulative, whether the metadata is a start or end of an interaction, or parties involved in the web service. An activity type may for example be voice, e-mail, post, browse, search, file transfer, contact list, inbox or other types. An activity subtype may be more specific kinds of activity, such as e-mail message, e-mail attachment, e-mail draft, browsing a main page, browsing privately, instant messaging privately, or instant messaging in a chat room, for example. Whether metadata is cumulative may depend on whether the metadata is related by web service to other metadata within a particular time frame. For example, instant message metadata coming from the middle of a chat conversation may be assigned a numerical identifier that indicates it is cumulative, because it is related to the other instant metadata within a certain time frame. An instant messaging metadata object at the end of a chat conversation, for example, may have a numerical identifier or indicator that indicates an end to an interaction. Other kinds of numerical identifiers may be generated. The dataflow manager, described in more detail below, may correlate, associate or group multiple abstractions to each other that include numerical identifiers and the metadata by comparing the similarity of their assigned numerical identifiers.

Figure 3:
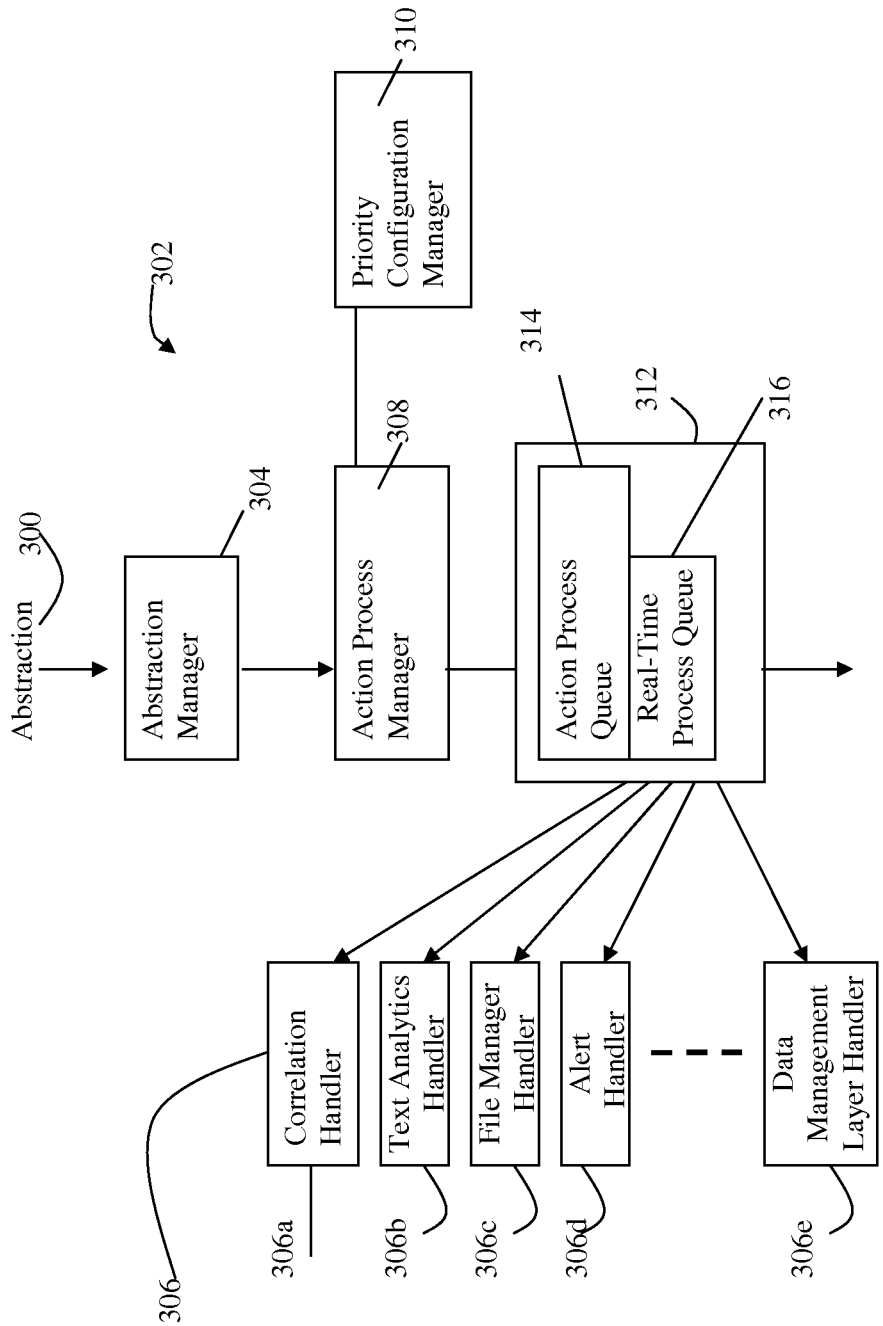
FIG. 3 is a schematic illustration of the components in a data flow manager, according to an embodiment of the invention.

FIG. 3 is a schematic illustration of the components in a data flow manager, according to an embodiment of the invention. Metadata, via an abstraction, 300 from the extraction engine of may be sent to the data flow manager 302 to determine one or more activities performed by the target device. An abstraction manager 304 may manage the processing of the input metadata 300. The abstraction manager 304 may create a base activity object, pointer, or temporary memory, or separate data object for each metadata object. The base activity object may vary depending on the type of metadata object sent through the data flow manager 300. The base activity object may be or may point to an instance of the base activity class, which provides methods for sending the metadata information through various handlers 306. Other objects and instances of other classes may be used, and they may have different names. The handlers 306 may point to various computing resources for processing the metadata 300. There may be different handlers 306 for different processing needs. For example, FIG. 3 illustrates a correlation handler 306a, text analytics handler 306b, file manager handler 306c, alert handler 306d, and a data management layer 306e handler. Other handlers 306 may be used, and in other embodiments the functionality described herein as being performed by handlers may be performed by other modules.

Each handler may specialize in a particular type of processing. For example, the correlation handler 306a may correlate (to each other) or group related abstractions. The text analytics handler 306b may analyze messages related to each abstraction and extract the most relevant content. The file manager handler 306c may manage and analyze the files associated with metadata. The alert handler 306d may determine whether an alert should be sent via text, e-mail, or pop-up message if sensitive information is accessed by a user, or inappropriate content is accessed by a user. The data management layer handler 306e may receive an activity and prepare the activity for storage. Each handler 306 may take as input the base activity object, process the data described in the base activity object, and output a modified, processed version of the base activity object. The handlers' processing may assist in simplifying the abstraction data so that they may more easily be correlated.

The abstraction manager 304 may send the base activity object to an action process manager 308, which manages the priority queue of processing metadata 300 through the various handlers 306. The action process manager 308 may reference a priority configuration manager 310 to determine the order of handlers 306 that will process each metadata object 300. In other embodiments different handlers may be used, and handlers need not be used.

Processors 102a, 108a, 114a, 116a, 118a, 122a, and 126a may execute software or code to perform methods describe herein. Modules or engines (e.g., extraction engine 108, web service manager 200, chunks builder 122, process unit 312, etc.) may be implemented as processors executing software or code. While FIGS. 1-3 describe specific structures, the various functions distributed among the various units may be performed by different units in other embodiments, and the arrangement or distribution of components may be different. For example, one computer including one or more processors may perform embodiments of the present invention.

The priority configuration manager 310 may identify each handler for example with an ID. The handlers 306 and their IDs may be stored for example in a table or hash table, in an example shown below:

TABLE 1

Identifying Handlers In a Table

| Handler ID | Handler |
|---|---|
| 0 | Start action |
| 1 | Correlation |
| 2 | Text Analytics |
| 3 | File Manager |
| 4 | Alert |
| 5 | Data Management Layer |

The priority configuration manager 310 may maintain a metadata type dictionary that relates to a flow configuration dictionary, where each type corresponds to its own flow configuration. The flow configuration may inform the action process manager 308 the priority queue of handlers 306 that process each metadata 300. A flow configuration may be stored as a table or other data structure that describes a first handler 306 and a next handler 306. An example of a flow configuration table is shown below.

TABLE 2

Flow Configuration Table

| Handler ID | Next Handler ID |
|---|---|
| 0 | 1 |
| 1 | 4 |

TABLE 2-continued

Flow Configuration Table

| Handler ID | Next Handler ID |
|---|---|
| 2 | 5 |
| 4 | 2 |

The flow configuration may correspond with a metadata type, such as an instant messaging type, e-mail type, or other types. In conjunction with Table 1, Table 2 in the priority configuration manager 310 may inform the action process manager 308 that for a particular metadata type, such as for instant messaging, the metadata 300 should be processed through handlers 306 for example in the following order: Start, Correlation, Alert, Text Analytics, and finally the Data Management Layer. Other orders may be used, and a specific ordering need not be used. In other embodiments, other data for tables 1 and 2 may be used, and tables of data need not be used.

The action process manager 308 may send the base activity object to the action process unit 312 according to an action process queue 314 or real-time process queue 316. Real-time processing may be advantageous for users on a monitoring device who desire to view results of activity aggregation more quickly. When users do not need to view results immediately, the action process queue may more efficiently use processing bandwidth. The action process queue 314 may implement a typical priority queue, and the real-time process queue may implement an accelerated queue for processing metadata 300. Whether handler 306 processing is queued in real-time or not may be determined by the priority configuration manager 310. Implementation of the action process queues 314 and the real-time process queues 316 are described in FIGS. 4 and 5.

Figure 4:
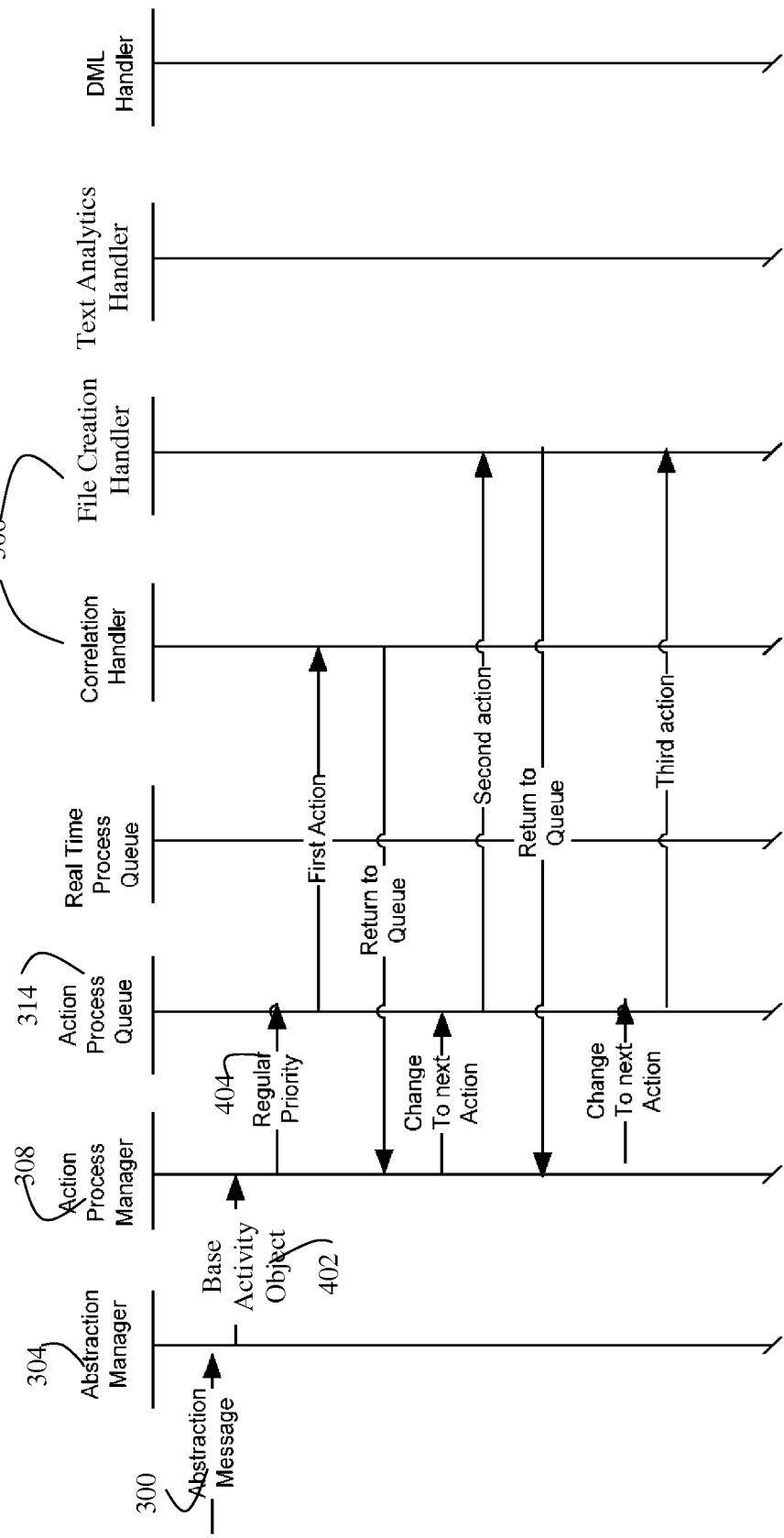
FIG. 4 is an example of a flow process diagram as implemented data flow manager, according to an embodiment of the invention.

FIG. 4 is an example of a flow process diagram as implemented in an action process queue 314, according to an embodiment of the invention. As previously discussed, metadata via an abstraction message 300 is sent to the abstraction manager 304, which creates a base activity object 402. The base activity object 402 may be sent to the action process manager 308, which may reference the priority configuration manager 310 (in FIG. 3) to lookup the appropriate flow configuration and determine the next handler 306 to process the base activity object. In the depicted example, if the real-time process queue is not used, the base activity object 402 is sent back to the action process manager 308 to receive regular priority 404 queuing at the action process queue 314, after processing at each handler 306.

Figure 5:
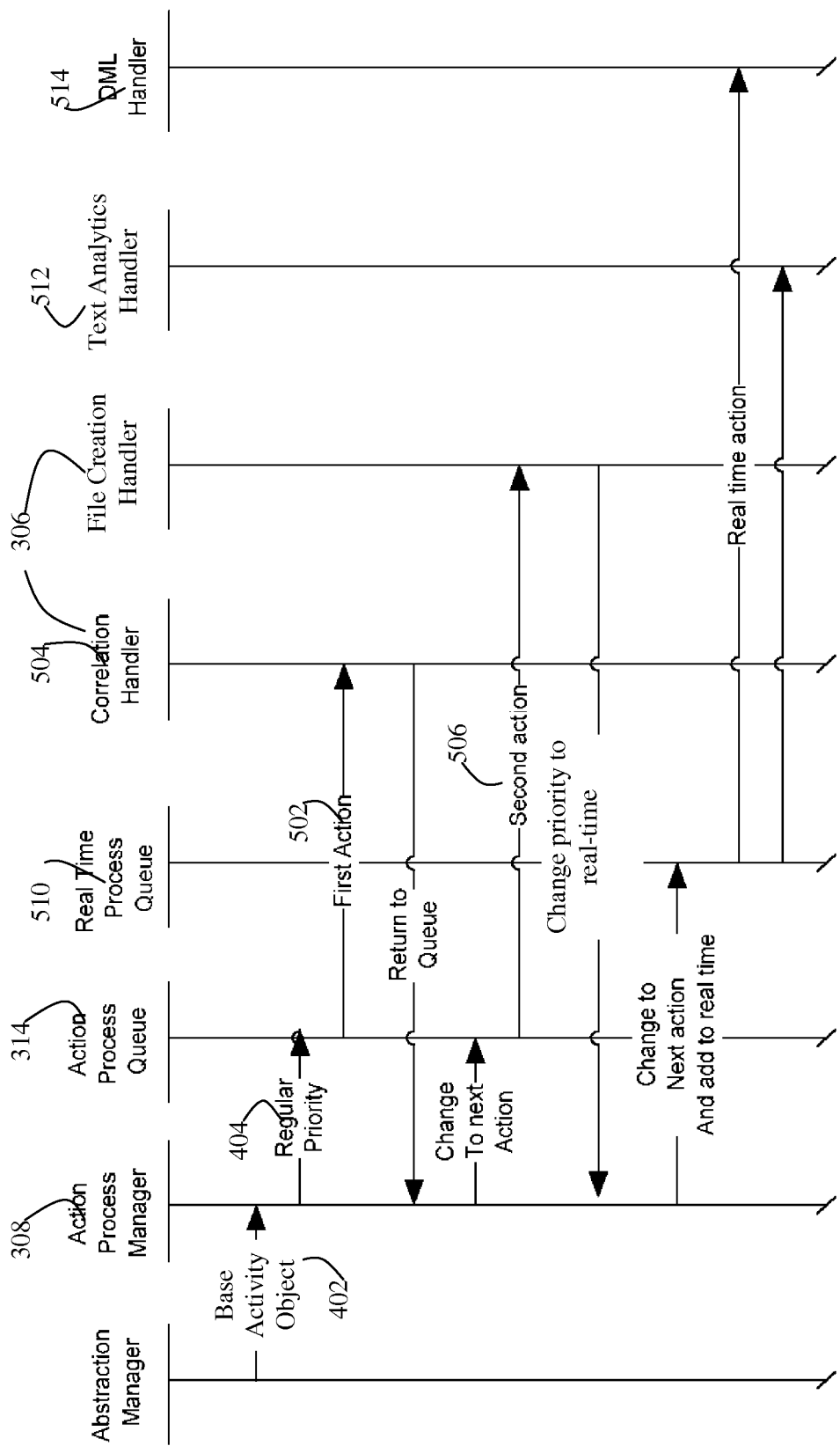
FIG. 5 is an example of a flow process diagram using real-time priority, according to an embodiment of the invention.

FIG. 5 is an example of a flow process diagram using real-time priority, according to an embodiment of the present invention. In this example, the first action 502 may send the base activity object 402 to be processed at the correlation handler 504. Based on the flow configuration dictated by the priority configuration manager, the action process manager 308 may place the base activity object 402 in a regular priority queue at the action process queue 314. After the second action 506, however, the action process manager 308 may change the priority to real-time priority 508 and place the base activity object 402 at the real-time process queue 510, instead of the action process queue 314. The real-time process queue 510 may send the base activity object 402 to the handlers 306 as dictated by the priority configuration manager, but the base activity object 402 might not be returned to the action process manager 308 to join the action process queue 314. The real-time process queue 510 concurrently pushes the base activity object towards the appropriate handler for processing, e.g., the DML handler 514 and text analytics handler 512 as shown. After all required handlers, the base activity object may be returned back to the action process manager 308. Other handlers or combinations of handlers may be used.

As previously described, the abstraction manager may create a base activity object that includes the metadata information received from the extraction engine. The action process manager 308 may send the base activity object to various handlers for processing, including to the correlation handler. The correlation handler may output an activity map that includes correlated base activity objects containing metadata and a list of files related to the base activity objects. The correlation handler correlates or associates the metadata to other metadata or groups the metadata based on for example similar web parameters represented in the metadata. The correlation handler may compare the assigned numerical identifiers of the metadata objects by comparing the numerical identifiers represented in the abstraction data object, and metadata having similar numerical identifiers may be correlated to each other or grouped with each other. Based on the correlated metadata, the correlation handler may output an activity or activity data object. The activity data object may include information on activity identification (represented numerically, for example), duration, web host, parties involved, and the metadata and content data that make up the activity. Other methods of correlating or associating the metadata may be used.

In some embodiments, the correlation handler may first check if the metadata in the base activity object is cumulative. Metadata may be cumulative if they describe one part of a user's interaction. For example, metadata that describes a chat message may be cumulative, because a user likely exchanged many messages with a person. In another example, metadata indicating that a user is adding an item to a shopping cart on an online shopping site may be cumulative, because metadata describing a purchase is likely to follow. If the base activity object indicates the metadata is not cumulative, the correlation handler may output the metadata as an activity. Metadata indicating a post to a blog, for example, might be deemed not cumulative. The correlation handler may output an activity data object that includes for example an activity ID signifying a blog post, the web host, a time of posting, and a reference to the content of the post. Other data may be output. If the correlation handler determines that incoming metadata is cumulative, the correlation handler may check if the metadata is the start of an interaction. If so, the correlation handler may add the metadata to an empty activity object. Subsequent metadata that are cumulative but which continue an interaction may be merged with the new activity data object if the numerical identifiers between the starting metadata and continuing metadata are similar. Numerical identifiers may be similar if they indicate the same web service parameters, for example, the same to/from fields in an e-mail, the same subject line of an e-mail, the same instant message parties, or the same topic browsed on a web page. Other parameters may be used to indicate similarity. However, it may not be necessary for all of the numerical identifiers of one abstraction to match all the numerical identifiers of another abstraction. This may further allow correlation between web services, for example, multiple attachments of one e-mail may be correlated along with the e-mail message itself, or an e-mail message using one webhost may be correlated with a chat message on another web host if they are addressed to the same party and occur in similar time frames. If the correlation handler determines that metadata signifies the end of an abstraction, the metadata is merged with the activity object that includes other related metadata, and the correlation handler may output the activity data object. Metadata may be merged into one or multiple activity data objects.

In some embodiments, activities or activity data objects may be aggregated into chunks or groups. Each chunk or group may correspond to a portion or period of time or time frame and one or more activities performed by the target. A chunk data object may include or be described by a start and end time describing a portion of time, and may reference a list of activities occurring during the time portion or period. Activities may be aggregated or compiled into chunks according to a category or type of activity that is performed in a portion or period of time, e.g., aggregation may depend on the chunk duration. A category of activity that is aggregated or compiled into one or more chunks may be for example communicative activity, browsing activity, or downloading activity, or another activity. Categories of activity may also be according to the parties involved in an interaction, e.g. senders/receiver of e-mail or recipients of chat messages or other data traffic. Categories may also be according to a group of parties or individuals that a target interacts with, such as supervisors, team members, other company departments, or personal contacts, for example. The categories may facilitate viewing large volumes of data of different source types in a meaningful way to the human monitor, and may enable the monitoring process on a continuous flow of target(s) traffic as it is structured into a queue of chunks. Each activity or activity data object may be aggregated into one chunk or multiple chunks. The chunks may be stored in a database and retrieved upon display.

Figure 6A:
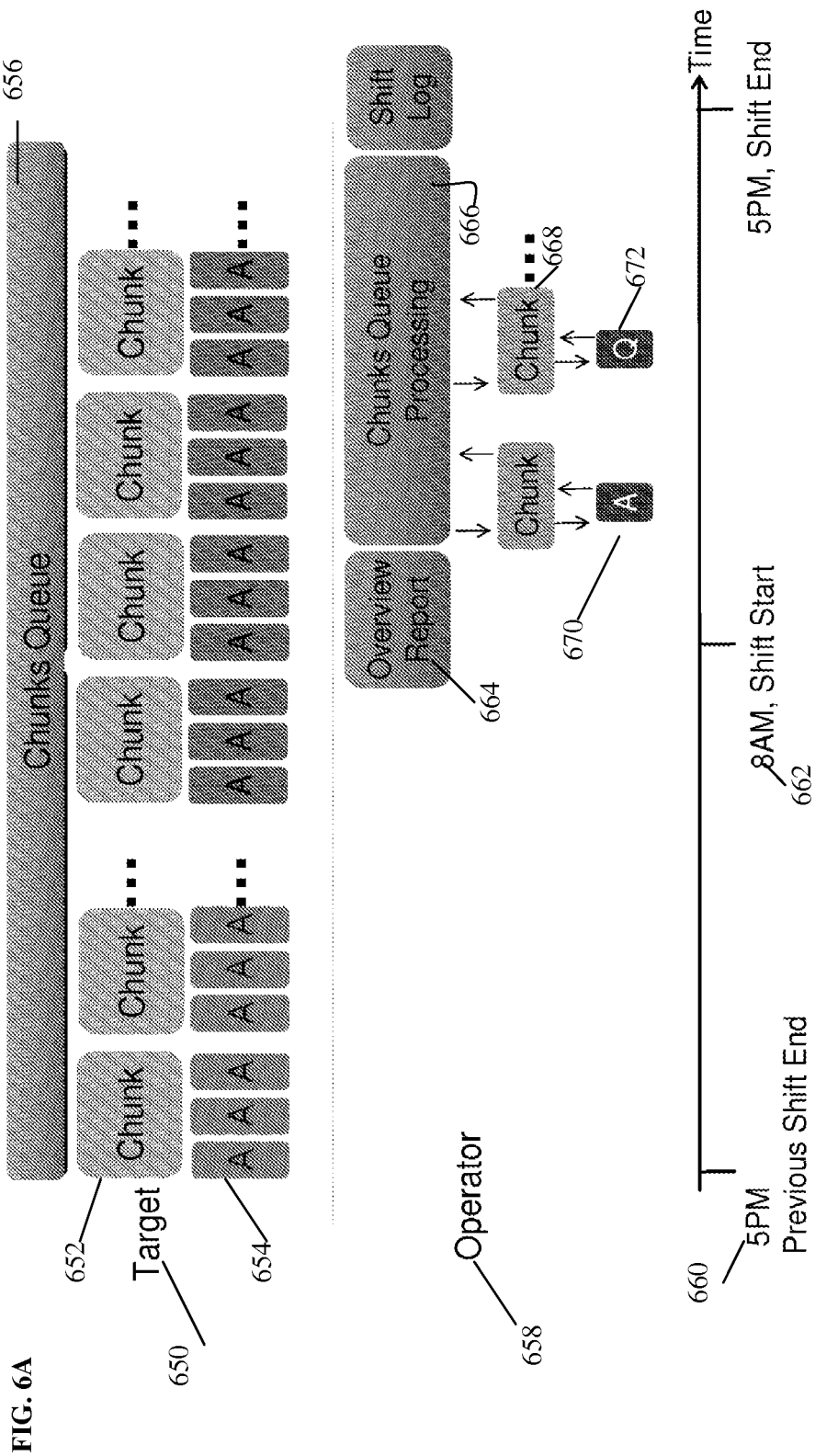
FIG. 6A illustrates a monitoring process, according to an embodiment of the invention.

FIG. 6A illustrates a monitoring process, according to an embodiment of the invention. Continuous IP traffic may be generated by a target 650, while activities 654 and chunks 652 may be determined automatically by the system. Each determined activity 654 (or data representing the activity) of the target 650 may be aggregated into chunks 652, and the chunks 652 may be ordered in a chunks queue 656. The chunks 652 and activities 654 may be generated even if an operator 658 or monitor is not working a shift, as shown by the example lack of operator activity between 5 pm 660 and 8 am 662. When the operator 658 begins a shift, the operator 658 may view an overview report 664 of the target's 650 previous activity. Chunks queue processing 666 may process the chunks from the queue of chunks 656, depending on the parameters that the operator inputs into a display or user interface. Different chunks 668 representing different groups of activities may be displayed, based on a desired time period for each chunk. For example, the operator 658 may desire to view chunks of specific categories of activities, or chunks with varying time periods. The operator 658 may drill down or zoom in through chunks to view nested or subset chunks, or the operator 658 may drill down the chunks into individual activities 670 that make up the chunks. Nested or subset chunks may correspond to or describe activity in time portions that are part of the larger time portion making up or corresponding to the larger chunks. E.g., a larger or parent chunk may include a number of nested chunks, and each of those nested chunks corresponds to a different part of the time portion corresponding to the larger or parent chunks. Nested chunks may also include more nested or subset chunks within them.

The operator 658 may also execute or run a query 672 on a particular chunk 668 viewed, or a group of chunks. Chunks 668 may be always displayed, so that real-time monitoring does not lose data. The drill-down functions may open on separate screens. The operator 658 starting the shift may quickly overview the chunks and produce those events of interest on another screen or printout, for example. Historical chunks may be processed as new chunks arrive (new data coming in near real time as the target(s) generate traffic). While relevant for a continuous flow of data, the monitoring process may also be very powerful to execute or run on historical data collected in the system (e.g., a set of data). The monitoring process may reduce the overall time for an operator to gather intelligence on a target's activities. As an example of reducing the time for intelligence gathering tasks, during a 24-hour period, a summarized view may present 15-minute chunks of a target's activity, which may produce 96 chunks that represent a target's day (e.g., 24 hours multiplied by 4 chunks/hour). More than half of all chunks, for example, may include IP traffic during idle periods. A human monitor may only need to evaluate approximately 40-45 chunks of active interactions to gain an understanding of a target's activity in one day. During situation analysis of the active chunks, the human monitor may take 30-60 seconds, for example, to review an active chunk. Thus, in this example, at most, the human monitor may take approximately 40 minutes to comprehend a target's activity for one day. Whereas previous intelligence gathering may require many hours of parsing a target's interactions across many types of Internet applications, embodiments of the present invention may reduce the time for intelligence gathering and comprehension through summarized chunks of a target's activity. Other lengths of time for chunks may be used, such as 20 minutes, 30 minutes, an hour, or 2 hours, for example.

FIGS. 6B-6E demonstrate displaying a queue or graph of chunks, according to an embodiment of the invention. In one embodiment, shown in FIG. 6B, activities 600 may be determined or extracted from IP data. For simplicity and by way of example only, the activity data shown has three data fields: a time stamp 602, activity ID 604, and source (webhost) 606. Other data fields may be used. Activity data 600 may include other data fields and parameters or properties. Displaying a queue of chunks may be based on display parameters or properties requested by a user at a monitoring station or computer. A user may be able to access the activities represented in each displayed chunk through interacting on a graphical user interface, for example. Display parameters may include a time resolution, time frame of activity, category of activity, or visual separation between displayed chunks. Time resolution may be the amount of activities per increments of time that a user would like to see, such as one activity or description of an activity every an hour, half an hour, or five minutes. A user may be able to see more detailed chunks of activity with a finer time resolution, because the user may desire to see more activities may be represented in a shorter time period. Conversely, a user may see chunks with less activity detail with a rougher time resolution. Visual separation of chunks may be the increments of time that a user wishes to view each chunk. For example, a user may wish to see chunks covering a maximum time period or portion of 15 minutes or an hour. Display parameters may include a category of activity. The time duration of a displayed chunk may be dynamically adjusted, so that the time period may always include a predefined number of activities or chunks. In a monitoring process, a new chunk is created as traffic is flowing in, and added to the queue of chunks being viewed and analyzed by the human monitor.

Figures 6C, 6D:
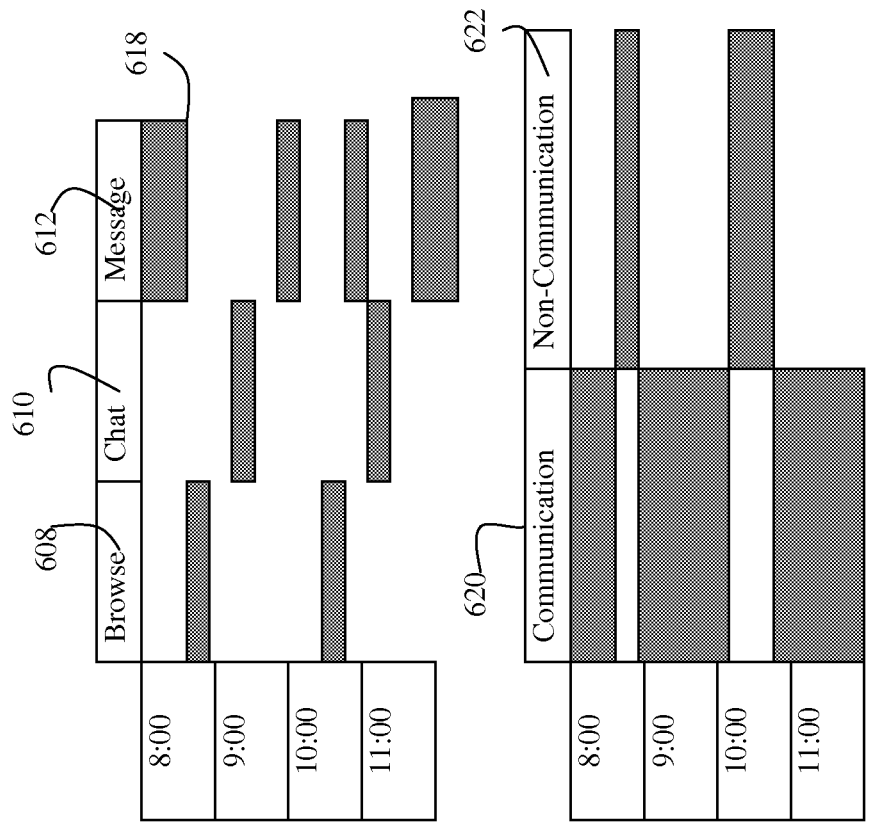

FIG. 6C illustrates a queue or graph of chunks according to one scheme of activity categorization, e.g., activity types such as browse 608, chat 610 and message 612. Each activity 600 may correspond to one of the activity types 608, 610, and 612. For example, e-mail 614 and posting 616 activities may correspond to the message category 612. A chunk representing both e-mail and posting activities 618 may be displayed during a portion of time, such as between 8:00 and 9:00, as illustrated. A user may hover (e.g., using a pointing device such as a mouse or touch screen) over the chunk or click on the chunk, for example, in order to perform drill down to view the activities represented in the chunk, or the chunk that is clicked on may be divided into further chunks. A user may also run queries on the content contained within the chunks. FIG. 6D illustrates another scheme of activity categorization, e.g., communication 620 and non-communication 622 types or categories. Since this scheme may use broader categories, more activities may be represented in each chunk. More chunks may be displayed by lengthening the visual time frame, e.g. viewing the queue of chunks between 8:00 and 3:00. Other categories of activity may be applied, such as web hosts, web services, or recipients of data traffic and messages. If an activity is in the communication category, the activity may be further categorized in a community, e.g. a pre-defined group of people that the target may be interacting with, such as family members, project team members, friends, or other co-workers, for example.

Figure 6E:
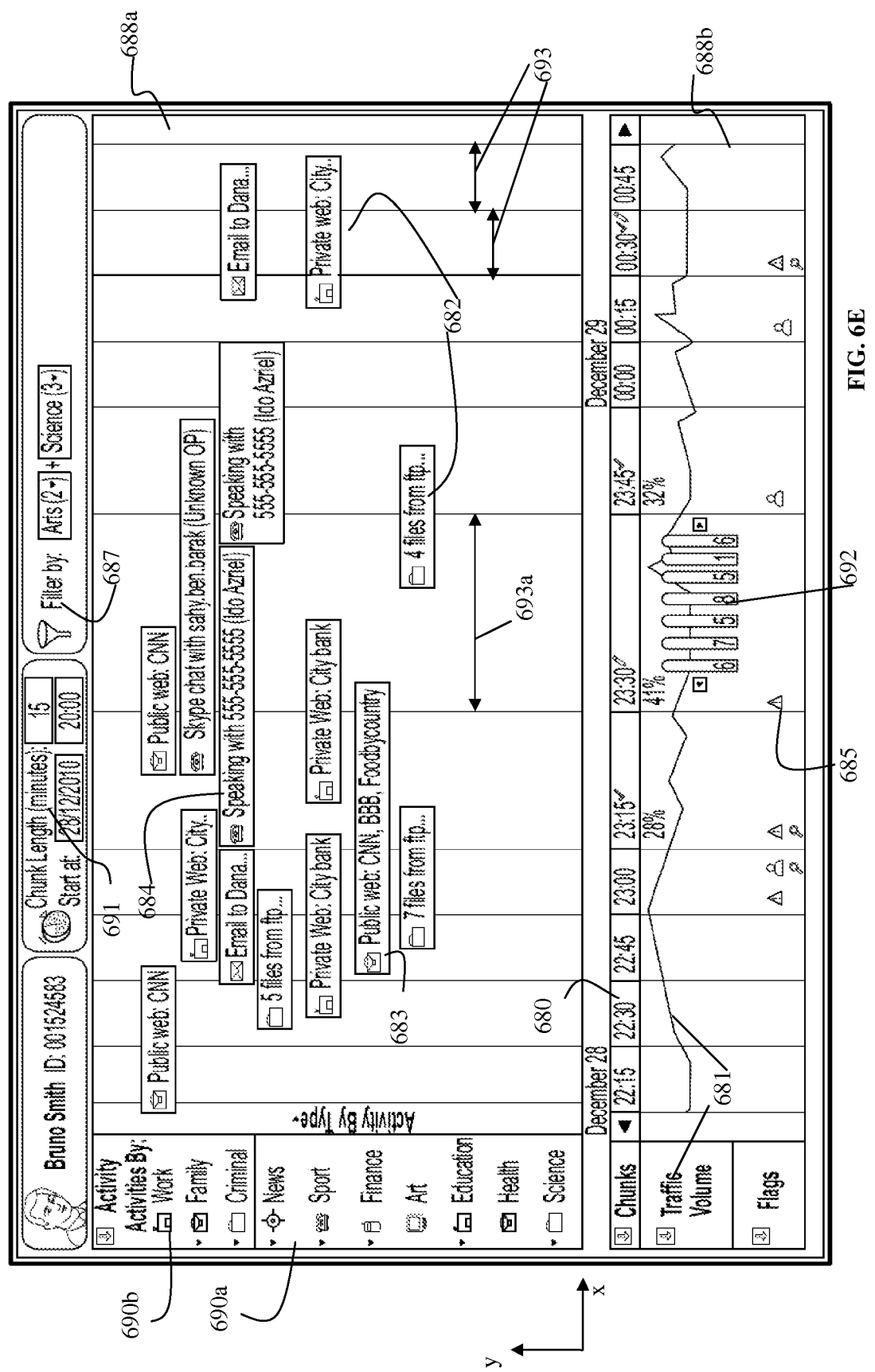

FIG. 6E is an example of a screen view produced by an integrated monitoring application, according to an embodiment of the invention. This type of composite screen may provide a human monitor with the necessary comprehension of Web/IP traffic. This screen may coincide with chunks queue processing 666 in FIG. 6A. The screen, as shown, may be divided into two windows. The top window 688*a* may display aggregated activities 682. In the 'x' axis direction, time may be represented in a horizontal timeline 680, and the 'y' axis direction may be the various categories/types of the activities 690*a* and within which communities 690*b* the activities occur. Aggregated activities 682 may be displayed according to a category of activity, or activity type, such as by public web 683 in the finance category or communication voice call in a criminal community 684, for example. The human monitor may zoom in or out to chunks 693 of shorter or larger time interval by adjusting chunk length 691, for example. As shown in the figure, chunks 693 may have a length of 15 minutes. Other lengths may be used, such as 20 minutes or 5 minutes, for example. The human monitor may also go directly to the activities that comprise the aggregated activities 682. For example, by clicking on aggregated public web activity 683, all the activities that comprise this aggregated activity may be displayed in more detail, such as browsing CNN, BBB, Foodbycountry, or other sites. The bottom window 688*b* may display alerts, indicators and other flags 685 that may provide additional calculated and associative information to assist in evaluating the activities in the chunks, such as chunk 693*a*. Aggregative mini graphs 692 describing chunk distributions may be included, such as traffic volume 681 within the chunk, which may be tracked through time, and may be used to compare behavior between chunks 693. In the top window 688*a*, the size or time frame of each chunk may be adjusted according to a monitor's input, and queries may be defined to search through each chunk. Activities or chunks displayed may be filtered 687 by one or multiple categories and parameters.

Figure 7:
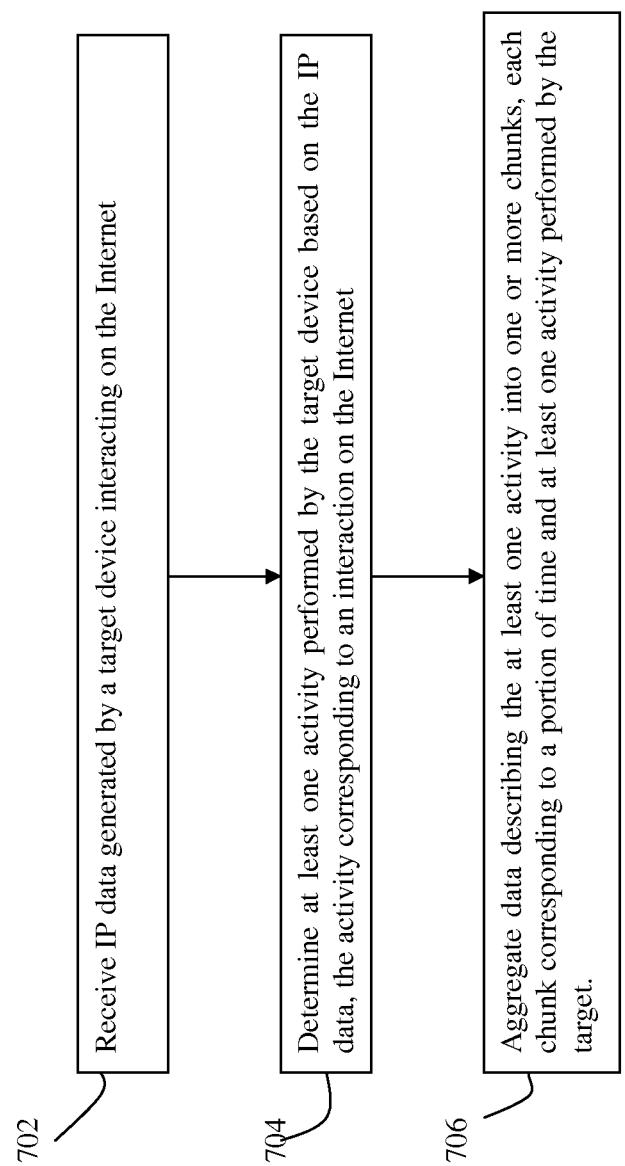
FIG. 7 is a flowchart of a method of IP data monitoring, according to an embodiment of the invention.

FIG. 7 is a flowchart of a method 700 of IP traffic monitoring, according to an embodiment of the invention. In operation 702, a processor may receive IP data traffic generated by a target device interacting on the Internet. Interactions may include browsing websites, entering search queries into a search engine or electronically communicating through instant messaging or e-mail messages, for example. The processor or a server may extract, from the received IP data, metadata objects linked to respective content data. Each metadata object may describe at least one web service accessed by the target device, and the content data linked to the metadata object may describe content exchanged between the target device and a server providing the web service.

In operation 704, a processor may determine at least one activity performed by the target device based on the IP data, and the activity may correspond to or describe an interaction on the Internet or computer network exchanging IP data. Metadata may be assigned one or more numerical identifiers or indicators. The numerical identifiers may indicate or identify web service parameters. Web service parameters may include a web host name, a party involved in the interaction, a time stamp, an activity type, or a file related to the interaction, for example. Similar web service parameters may be determined by comparing the numerical identifiers. A processor may correlate, associate or group metadata with similar numerical identifiers describing similar web service parameters. An activity performed by the target device may be determined from the correlated metadata.

In operation 706, a processor may combine or aggregate data describing the at least one activity into one or more groups or chunks. Each group or chunk may correspond to a portion or period of time, and at least one activity performed by the target. A chunk may include multiple activities and aggregation into a chunk may be according to a category of activities performed by the target. Each activity may be aggregated into more than one chunk. Other or different operations may be used.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller (e.g., one or more of the processors shown in FIG. 1), cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for monitoring Internet Protocol (IP) data traffic, comprising:
receiving IP data generated by a target device interacting on the Internet;
extracting, from the received IP data, metadata objects linked to respective content data, wherein each metadata object describes at least one web service accessed by the target device, and wherein the content data linked to the metadata object describes content exchanged between the target device and a server providing the web service;
correlating metadata objects based on similar web service parameters; and
determining at least one activity performed by the target device based on the correlated metadata objects, the activity corresponding to an interaction on the Internet; and
aggregating data describing the at least one activity into one or more chunks, each chunk corresponding to a portion of time and at least one activity performed by the target device.

2. The method of claim 1, further comprising:
storing the content data into a storage device, wherein each metadata object includes a reference to the location of the respectively linked content data in the database, and wherein data describing the at least one activity includes a reference to the correlated metadata objects.

3. The method of claim 1, comprising:
displaying a queue of the one or more chunks on a graphical user interface, the one or more chunks including nested chunk objects, wherein each nested chunk object corresponds to a time portion that is part of the time portion corresponding to the one or more chunks.

4. The method of claim 3, wherein displaying a queue of the one or more chunks comprises:
receiving one or more parameters describing at least one of a time resolution, time frame of activity, category of activity, and visual separation between displayed chunks; and
displaying a queue of the one or more chunks based on the one or more parameters.

5. The method of claim 1, further comprising categorizing the activity as communication or non-communication, wherein a communication activity describes an interaction between or among users on the Internet and a non-communication activity describes content consumption on the Internet.

6. The method of claim 1, wherein correlating metadata objects based on similar web service parameters comprises:
assigning one or more identifiers to the metadata objects, the identifiers based on the similar web service parameters, wherein web service parameters include one or more of a web host name, a party involved in the interaction, a time stamp, and an activity type;
comparing the assigned identifiers of the metadata objects; and
correlating metadata objects with similar identifiers.

7. The method of claim 1, comprising:
generating an alert based on the at least one determined activity.

8. The method of claim 1, wherein aggregating the data describing the at least one activity into one or more chunks comprises aggregating data describing multiple activities into one or more chunks, wherein each chunk corresponds to a portion of time and a category of activities performed by the target device.

9. A computer system comprising:
a processor; and
a memory to store received IP data, wherein the processor is to:
receive IP data generated by a target device interacting on the Internet;
extract, from the received IP data, metadata objects linked to respective content data, wherein each metadata object describes at least one web service accessed by the target, and wherein the content data linked to the metadata object describes content exchanged between the target device and a server providing the web service or between target devices;
correlate metadata objects based on similar web service parameters;
determine at least one activity performed by the target device based on the correlated metadata objects, the activity corresponding to an interaction on the Internet; and aggregate data describing the at least one activity into one or more chunks, each chunk corresponding to a portion of time and at least one activity performed by the target device.

10. The computer system of claim 9, wherein the processor is to aggregate data describing multiple activities into one or more chunks, wherein each chunk corresponds to a portion of time and a category of activities performed by the target device.

11. The computer system of claim 9 wherein the processor is to:
receive one or more parameters describing at least one of a time resolution, time frame of activity, category of activity, and visual separation between displayed chunks; and
display a queue of the one or more chunks based on the one or more parameters.

12. The computer system of claim 9, wherein the processor is to correlate metadata objects based on similar web service parameters by:
assigning one or more identifiers to the metadata objects, the identifiers based on the similar web service parameters, wherein web service parameters include one or more of a web host name, a party involved in the interaction, a time stamp, an activity type, and a file related to the interaction;
comparing the assigned identifiers between the metadata objects; and
correlating metadata objects with similar identifiers.

13. The computer system of claim 10,
wherein the memory is to store data describing multiple activities into a database; and
wherein the processor is to retrieve data describing the activities from the database upon aggregating the data describing the at least one activity into one or more chunks.

14. The computer system of claim 9, wherein the aggregating the data into one or more chunks comprises aggregating data describing multiple activities into one or more chunks, wherein each chunk corresponds to a portion of time and a category of activities performed by the target device.

15. A method comprising:
receiving IP data traffic generated by a target device interacting on the Internet;
extracting, from the received IP data traffic, metadata objects linked to respective content data, wherein each metadata object includes web application parameters describing at least one web service accessed by the target device, and wherein the content data linked to the metadata object describes content exchanged between the target device and a server providing the web service or between target devices;
categorizing the IP data from the IP data traffic according to the web application parameters, wherein the categories describe an interaction on the Internet; and
assigning the IP data to different groups based on the categorization and based on the time the traffic was transmitted.

16. The method of claim 15 wherein each group corresponds to a period of time.

17. The method of claim 15, comprising displaying the groups in a graph according to a web application parameter category and a time frame.

18. The method of claim 15, wherein categorizing the IP data is according to web hosts, web services, and recipients of the IP data traffic.

* * * * *